(12) United States Patent
Borts et al.

(10) Patent No.: US 10,236,746 B2
(45) Date of Patent: Mar. 19, 2019

(54) ELECTRIC MACHINE, LOCK AND ASSOCIATED METHOD

(71) Applicant: Regal Beloit America, Inc., Beloit, WI (US)

(72) Inventors: Zachary Alexander Borts, Dayton, OH (US); Stephen Thomas English, Englewood, OH (US)

(73) Assignee: Regal Beloit America, Inc., Beloit, WI (US)

( * ) Notice: Subject to any disclaimer, the term of this patent is extended or adjusted under 35 U.S.C. 154(b) by 544 days.

(21) Appl. No.: 14/969,116

(22) Filed: Dec. 15, 2015

(65) Prior Publication Data

US 2017/0170708 A1 Jun. 15, 2017

(51) Int. Cl.
| | |
|---|---|
| *H02K 11/33* | (2016.01) |
| *H02K 7/10* | (2006.01) |
| *H02K 5/10* | (2006.01) |
| *H02K 15/00* | (2006.01) |

(52) U.S. Cl.
CPC ............. *H02K 7/10* (2013.01); *H02K 5/10* (2013.01); *H02K 11/33* (2016.01); *H02K 15/0006* (2013.01)

(58) Field of Classification Search
CPC . H02K 7/10; H02K 11/33; H02K 5/10; H02K 15/0006
USPC .......................................................... 310/58
See application file for complete search history.

(56) References Cited

U.S. PATENT DOCUMENTS

| | | | |
|---|---|---|---|
| 7,249,644 B2* | 7/2007 | Honda | B60K 1/00 180/22 |
| 8,726,863 B2* | 5/2014 | Meistrick | F01L 1/08 123/90.15 |
| 2005/0084402 A1 | 4/2005 | Vanek | |
| 2007/0003406 A1 | 1/2007 | Racer et al. | |
| 2011/0187055 A1* | 8/2011 | Orlowski | F16J 15/187 277/303 |
| 2013/0259720 A1* | 10/2013 | Mills | F04D 29/5806 417/410.1 |
| 2014/0183998 A1* | 7/2014 | Hoehle | H01R 39/12 310/88 |
| 2014/0265737 A1* | 9/2014 | Yagi | H02K 15/0006 310/425 |
| 2018/0135759 A1* | 5/2018 | Hoehle | F16J 15/187 |

FOREIGN PATENT DOCUMENTS

| | | |
|---|---|---|
| EP | 1087138 B1 | 10/2003 |
| EP | 2746586 A1 | 6/2014 |
| IN | 200802824 I4 | 2/2010 |
| IN | A92010 * | 2/2010 ............. F16H 25/00 |

* cited by examiner

*Primary Examiner* — Terrance L Kenerly
(74) *Attorney, Agent, or Firm* — John Wigley

(57) ABSTRACT

An electric machine is provided. The machine includes a housing and a coil operably connected to the housing. The machine also includes a rotor. The rotor is rotatably secured to the housing and defines a first end of the housing which extends outwardly from a first end of the housing. The machine also includes a locking mechanism connected to the housing and selectively connected to the rotor. The locking mechanism is adapted to selectively provide a first mode in which the rotor may rotate relative to the housing and a second mode in which the rotor may not rotate relative to the housing.

16 Claims, 6 Drawing Sheets

ELECTRIC MACHINE, LOCK AND ASSOCIATED METHOD

BACKGROUND OF THE INVENTION

The embodiments described herein relate generally to an electric machine, and more specifically, to an electric motor.

An electric machine is typically in the form of an electric generator or an electric motor. The machine typically has a centrally located shaft that rotates relative to the machine. Electrical energy applied to coils within the machine initiates this relative motion which transfers the power to the shaft and, alternatively, mechanical energy from the relative motion of the generator excites electrical energy into the coils. For expediency, the machine will be described hereinafter as a motor. It should be appreciated that a machine may operate as a generator and vice versa.

A stationary assembly, also referred to as a stator, includes a stator core and coils or windings positioned around portions of the stator core. It is these coils to which energy is applied to initiate this relative motion which transfers the power to a rotor and then to a shaft. These coils are formed by winding wire, typically copper, aluminum or a combination thereof, about a central core to form the winding or coil. An electric current is directed through the coils which induces a magnetic field. It is the magnetic field that initiates this relative motion which transfers the power to the shaft.

The power transferred to the shaft is absorbed by a load that is applied to the shaft. The load may be applied by coupling the load to the shaft in any suitable manner. For example the shaft may be threaded on its end and a nut is threadably secured to the threads to hold the load onto the shaft. During assembly and disassembly of the load to the shaft, the shaft may need to be held stationary while torque is applied to the nut. For applications in which the shaft extend out of the motor on both of the opposed ends of the motor, the shaft end opposed to the load may be held stationary. For other applications where only the load end of the shaft protrudes from the motor, removing and securing the load, for example applying torque to the nut may be difficult.

The present invention is directed to alleviate at least some of these problems with the prior art.

BRIEF DESCRIPTION OF THE INVENTION

According to an embodiment of the invention, an electric machine is provided. The machine includes a housing, a coil operably connected to the housing and a rotor. The rotor is rotatably secured to the housing and defines a first end of the housing. The rotor extends outwardly from a first end of the housing. The machine also includes a locking mechanism connected to the housing and selectively connected to the rotor. The locking mechanism is adapted to selectively provide a first mode in which the rotor may rotate relative to the housing and a second mode in which the rotor may not rotate relative to the housing.

According to an aspect of the present invention, the electric machine may be provided wherein the electric machine further includes a controller for selectively electrically energizing said coil, a least a portion of said controller positioned adjacent a second end of said housing, the second end of said housing opposed to the first end of said housing.

According to another aspect of the present invention, the electric machine may be provided wherein the locking mechanism includes a pin and wherein the housing defines an opening in the housing to provide access to the pin.

According to another aspect of the present invention, the electric machine may further include a seal to seal the opening in the housing. The seal is adapted to permit movement of the pin to selectively slide the pin to selectively provide the first mode and the second mode.

According to another aspect of the present invention, the electric machine may further include a spring to bias the locking mechanism in the first mode.

According to another aspect of the present invention, the electric machine may be provided wherein the rotor includes a shaft and wherein the locking mechanism includes a pin. The pin is adapted to selectively engage the shaft to selectively provide the first mode and the second mode.

According to another aspect of the present invention, the electric machine may be provided wherein the shaft defines a longitudinal groove on the periphery of the shaft.

According to another aspect of the present invention, the electric machine may be provided wherein at least one of said housing and said rotor are adapted to cooperate with a pump.

According to another aspect of the present invention, the electric machine may further include a cam. The cam is adapted to position the locking mechanism in the selected one of the first mode and the second mode.

According to another embodiment of the present invention, an electric motor for use with a pump for use in a one of a pool and a spa is provided. The motor includes a housing, a stator and a rotor. The stator is fixedly secured to the housing. The stator includes at least one coil. The rotor is rotatably secured to the housing. The rotor includes a shaft which defines a centerline of the shaft. The shaft defines a first end of the shaft. The first end extends outwardly from a first end of the housing. The motor also includes a controller and a locking mechanism. The controller is utilized to selectively electrically energizing the coil to produce a magnetic field. At least a portion of the controller positioned collinear with the centerline of the shaft. The locking mechanism is connected to the housing and is selectively connected to the rotor. The locking mechanism is adapted to selectively provide a first mode in which the rotor may rotate relative to the housing and a second mode in which the rotor may not rotate relative to the housing.

According to another aspect of the present invention, the electric machine may be provided wherein the locking mechanism comprises a pin.

According to another aspect of the present invention, the electric machine may be provided wherein the housing defines an opening in the housing to provide access to the pin.

According to another aspect of the present invention, the electric machine may further include a seal to seal the opening in the housing. The seal is adapted to permit movement of the pin to selectively slide the pin to selectively provide the first mode and the second mode.

According to another aspect of the present invention, the locking mechanism may further include a spring to bias the locking mechanism in the first mode.

According to another aspect of the present invention, the electric machine may be provided wherein the locking mechanism includes a pin. The pin selectively engages the shaft to selectively provide the first mode and the second mode.

According to another aspect of the present invention, the electric machine may be provided wherein the shaft defines a longitudinal groove on the periphery of the shaft.

According to another aspect of the present invention, the electric machine may further include a spring to bias the locking mechanism in the first mode.

According to another aspect of the present invention, the electric machine may further include a cam to position the locking mechanism the selected one of the first mode and the second mode.

According to another embodiment of the present invention, a method for removing a pump impeller from the shaft of a motor is provided. The method includes the steps of providing a motor. The motor includes a fixed housing, a rotatable shaft, a fastener threadably connected to the shaft, and a locking mechanism. The locking mechanism is adapted to selectively provide a first mode in which the shaft may rotate relative to the housing and a second mode in which the shaft may not rotate relative to the housing. The method includes the steps of positioning the locking mechanism in the second mode, removing the fastener from the shaft by rotating the fastener relative to the shaft, and removing the impeller from the shaft.

DETAILED DESCRIPTION OF THE INVENTION

The method, systems and apparatus described herein facilitate the assembly and disassembly of a device to a shaft of an electric machine.

The electric machine typically includes a housing for containing and supporting a stator which is excited by an electrical source that excites an electromagnetic field in coils in the stator. The coils interact with a rotor rotatably supported in the housing to provide the mechanical rotational energy for the electrical machine. The rotor typically includes a shaft to which the load is connect to transfer the mechanical rotational energy to the load.

The power transferred to the shaft is absorbed by a load that is applied to the shaft. The load may be applied by coupling the load to the shaft in any suitable manner. For example, the shaft may be threaded on its end and a nut is threadably secured to the threads to hold the load onto the shaft. During assembly and disassembly of the load to the shaft, the shaft may need to be held stationary while torque is applied to the nut. For applications in which the shaft extends out of the motor on both of the opposed ends of the motor, the shaft end opposed to the load may be held stationary. For other applications where only the load end of the shaft protrudes from the motor, removing and securing the load, for example applying torque to the nut may be difficult.

Attempts to apply torque to the nut or lock a shaft may not be effective and may be very expensive. Inexpensive and reliable managing of locking a shaft or applying torque to the nut to secure a load to an electric machine is desirable in the design and manufacture of such electric machines. The method, systems and apparatus described herein facilitate locking of a shaft or applying torque to the nut to secure a load to an electric machine. Designs and methods are provided herein to facilitate inexpensive and reliable locking of a shaft or applying torque to the nut to secure a load to an electric machine.

Technical effects of the methods, systems, and apparatus described herein include at least one of reduced cost, improved serviceability, improved performance and quality and reduced labor costs.

Figure 1:
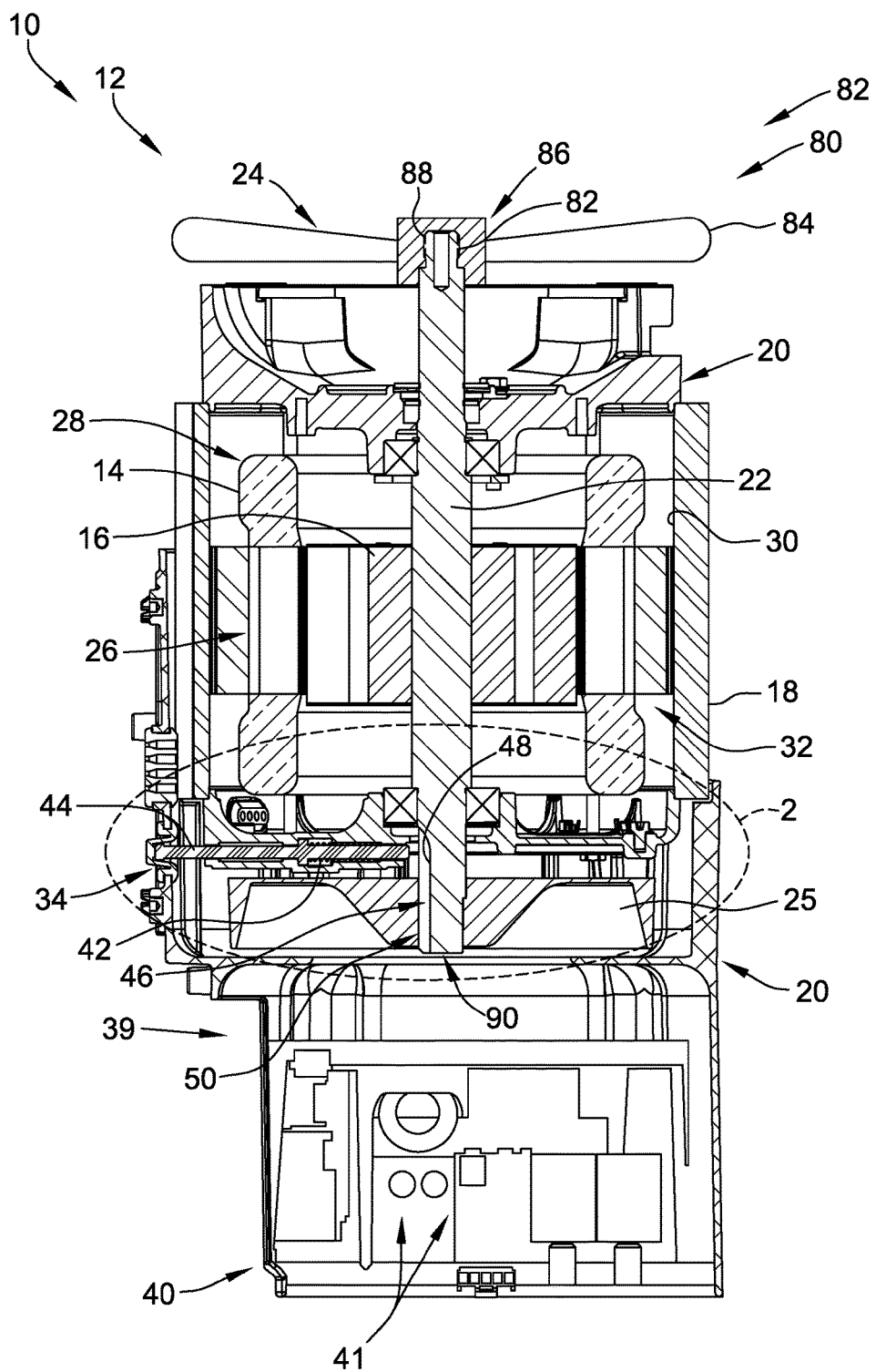
FIG. 1 is a cross-sectional plan view of an embodiment of the present invention in the form of an electric machine.

According to an embodiment of the present invention and referring to FIG. 1, an electric machine 10 is provided. The electric machine 10 may be an electric motor or an electric generator, but hereinafter will be described as an electric motor 10. It should be appreciated that the electric motor may be used to power any mechanism, for example, a pump, a cyclic drive, a compressor, a vehicle, a fan or a blower.

The electric machine 10 includes a housing 12, a coil 14 operably connected to the housing 12 and a rotor 16. The rotor 16 is rotatably secured to the housing 12 and defines a first end of the housing 12. The rotor extends outwardly from the first end of the housing 12.

The electric machine or motor 10 typically includes the rotor 16 that rotates relative to the motor 10. Electrical energy applied to typically a plurality of coils 14 within the motor 10. The coils 14 generate an electromagnetic field that cooperates with a magnetic field in rotor 16. The coils 14 initiate relative motion between the rotor 14 and the motor 12 that transfers the power from the coils to the rotor 14.

The housing 12 may include a plurality of components and may be made of a suitable durable material, for example a metal, a polymer or a composite. The housing 12 may, as shown, include a cylindrical shell 18 and opposed end caps 20. A shaft 22 may extend outwardly from a first end 24 of the electric motor 10, typically extending from one of the end caps 20. The motor 10 may have any suitable size and shape and may be, for example, an induction motor, a permanent-split capacitor (PSC) motor, an electronically commutated motor (ECM) motor, or a switched reluctance motor. The housing 12 may include protrusions, for example fins (not shown), for dissipation of heat. The motor 12 may also include a fan 25 positioned within housing 12, or, as shown, positioned within end cap 20, opposed to first end 24 of the electric motor 10.

It should be appreciated that the housing of the motor may have any suitable shape. One common shape of a motor housing is that of a cylindrical solid, having a generally cylindrical cross section. The shaft on a motor with such a shape generally extends from an end of the motor.

The motor 10 may be oriented in any direction, when in use. Typical orientations include a horizontal orientation or mount in which the shaft is parallel to the ground and a vertical orientation or mount in which the shaft is perpendicular to the ground.

The coils 14 are typically located in a stationary assembly 26, also referred to as a stator. The stator 26, typically includes stator core 28 and coils or windings 14 positioned around portions of the stator core 28. It is these coils 14 to which energy is applied to initiate this relative motion which transfers the power to the shaft. These coils 14 are formed by winding wire (not shown), typically copper, aluminum or a combination thereof, about a central core to form the winding or coil. An electric current is directed through the coils 14 which induces a magnetic field. It is the magnetic field that initiates this relative motion which transfers the power to the shaft 22.

Typically, the motor 10 includes the housing 12 having an inner wall or surface 30 that defines a motor cavity 32 therein.

According to the present invention and continuing to refer to FIG. 1, the motor 10 also includes a locking mechanism 34 connected to the housing 12 and selectively connected to the rotor 16. The locking mechanism 34 is adapted to selectively provide a first mode 36 in which the rotor 16 may rotate relative to the housing 12 and a second mode 38 in which the rotor 16 may not rotate relative to the housing 12.

The locking mechanism 34 may have any suitable construction and may be mechanically or electrically actuated. The locking mechanism 34 may be any type of mechanism capable of providing the first mode 36 in which the rotor 16 may rotate relative to the housing 12 and the second mode 38 in which the rotor 16 may not rotate relative to the housing 12.

For example, the locking mechanism 34 may be secured to the housing 12 and may be selectably secured to the rotor 16. The locking mechanism 34 may be in the form of a singular member extending from the housing 12 and connectable to the rotor 16. The locking mechanism 34 may be in the form of a plurality of component that are linked together from the housing 12 to the rotor 16.

The use of the locking mechanism 34 is particularly useful in applications where one end of the shaft 22 extends through one of the end caps 20 and the other of the ends of the shaft 22 is positioned within the other end cap 20. This other end is blind or not accessible for gripping to lock the shaft.

One such application with a blind shaft end is an application in which a motor component is positioned adjacent end cap 20. For example, the electric machine may, as shown in FIG. 1, be provided wherein the electric machine 10 further includes a controller 40 for selectively electrically energizing the coils 14. As shown in FIG. 1, a least a portion of the controller 40 positioned adjacent a second end 39 of the motor 10. The second end 39 of the motor 10 is positioned opposed to the first end 24 of the motor 10.

The controller 40 may have any of a number of electrical and electronic components 41 including for example, control boards, integrated circuits, resistors, capacitors and transistors. The controller 40 may make access to the second end 39 of the housing 12 difficult.

The locking mechanism 34 may be any suitable mechanism capable of selectively being positioned into the first mode 36 and the second mode 38. For example, the locking mechanism may include a cam 43, an arm, sets of gears, set of levers, a solenoid or other mechanical components. The locking mechanism may include mechanical and/or electrical components. If the locking mechanism includes electrical components, the locking mechanism may further include a controller to control the electrical components.

Figure 2:
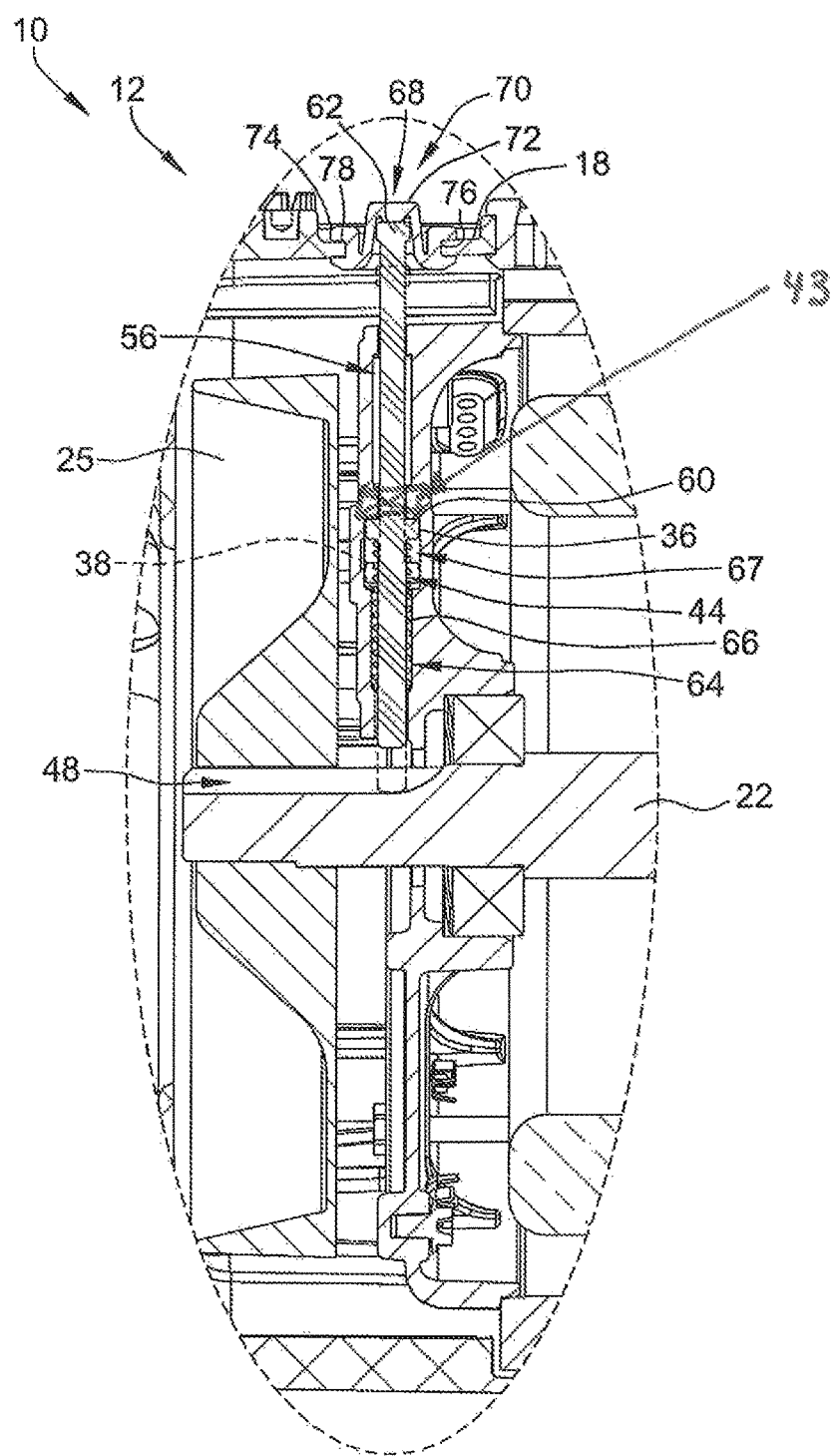
FIG. 2 is a partial plan view of a the locking mechanism according to an embodiment of the present invention installed in the electric machine of FIG. 1.
Figure 3:
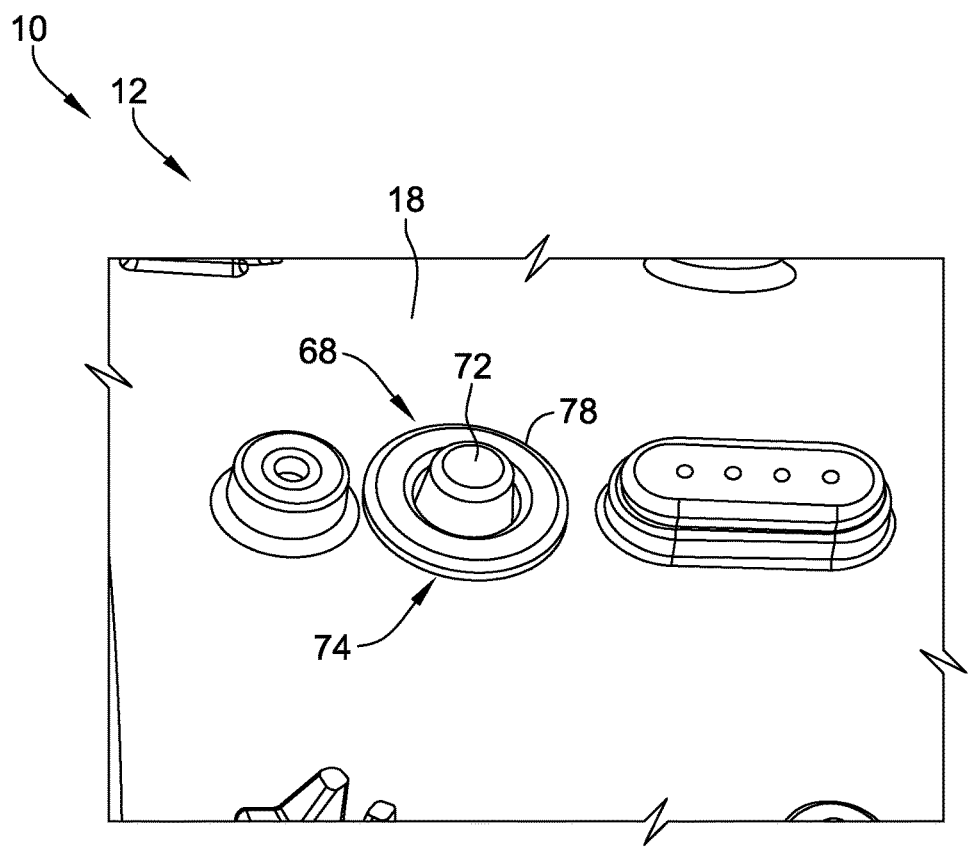
FIG. 3 is a perspective view of a engagement button to active the locking mechanism of FIG. 2 in the electric machine of FIG. 1.

As shown in FIGS. 1-5, the mechanism 34 may be mechanical and, may, as shown, be manually actuated into one or more of the first mode 36 and the second mode 38. Preferably and as shown in FIG. 2, the mechanism 34 includes a biasing mechanism 42 for biasing the mechanism 34 into the first mode 36, as shown in solid, or into the second mode 38, as shown in phantom. As shown in FIGS. 1 and 2, the biasing mechanism 42 biases the mechanism into the first mode 36. In the first mode 36, as shown, the shaft 22 is not locked.

For simplicity and according to another aspect of the present invention, the electric machine may, as shown in FIGS. 1-5, be provided wherein the locking mechanism includes a pin 44 which moves to provide the first mode 36 and the second mode 38. As shown the pin 44 is moveably secured to the stationary portion of the motor 10, for example to the stator 26 and/or the housing 12. It should be appreciated that alternately, the pin 44 may be secured to the rotating portion of the motor and engage the stationary portion of the motor.

As shown in FIG. 2 and for simplicity, the pin 44 may directly engage the rotating portion of the motor, also known as the rotor 16. For simplicity, the pin 44 selectively engages the shaft 22. As shown in FIGS. 1 and 2, the shaft 22 may include a cavity or void 46, for example, defined by a feature 48, for example, a groove, a flat or land formed in outer periphery 50 of the shaft 22. As shown, the feature 48 is in the form of a land 48. The pin 44 engaged in the cavity 46 with opposed vertical sides (not shown) that may provide additional resistance to torque as the shaft 22 attempts to be rotated.

For simplicity and as shown in FIG. 2, the pin 44 may be configured to slidably move into and out of engagement with the flat 48. For example, the pin 44 may be slideably received in a portion of the housing 12 of the motor 10.

Figure 4:
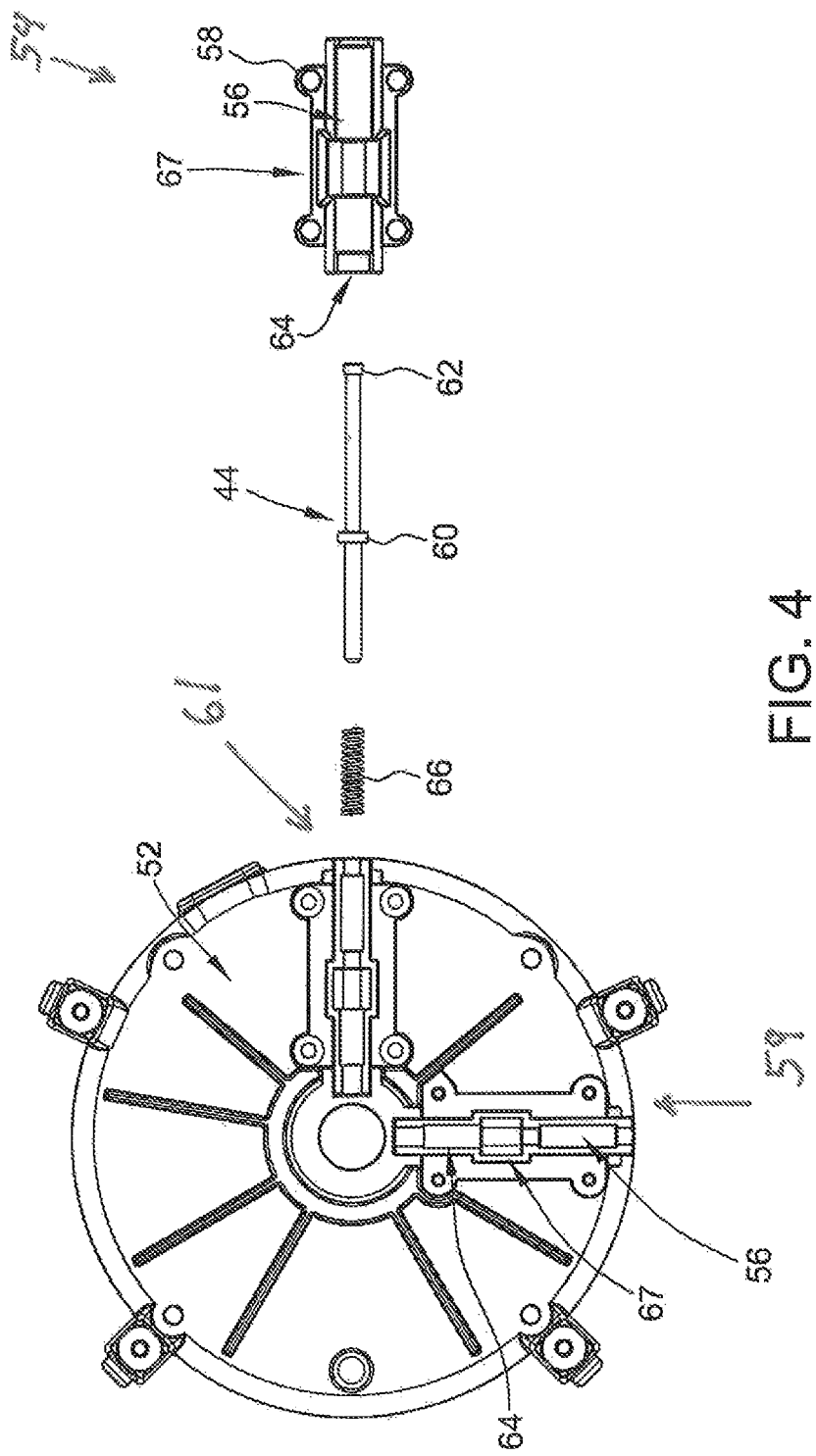
FIG. 4 is an exploded plan view of the locking mechanism of FIG. 2.
Figure 5:
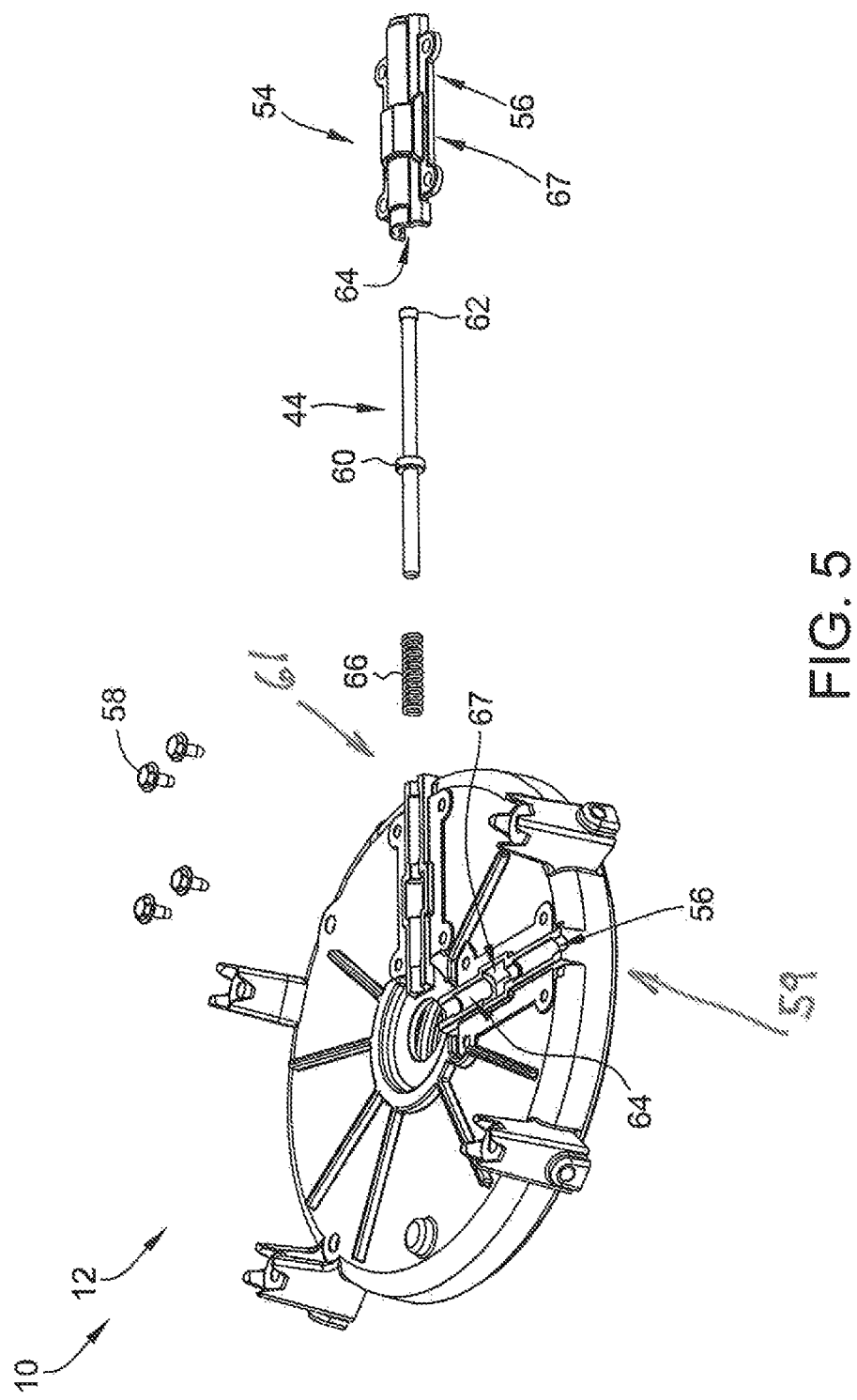
FIG. 5 is an exploded perspective view of the locking mechanism of FIG. 2.
Figure 6:
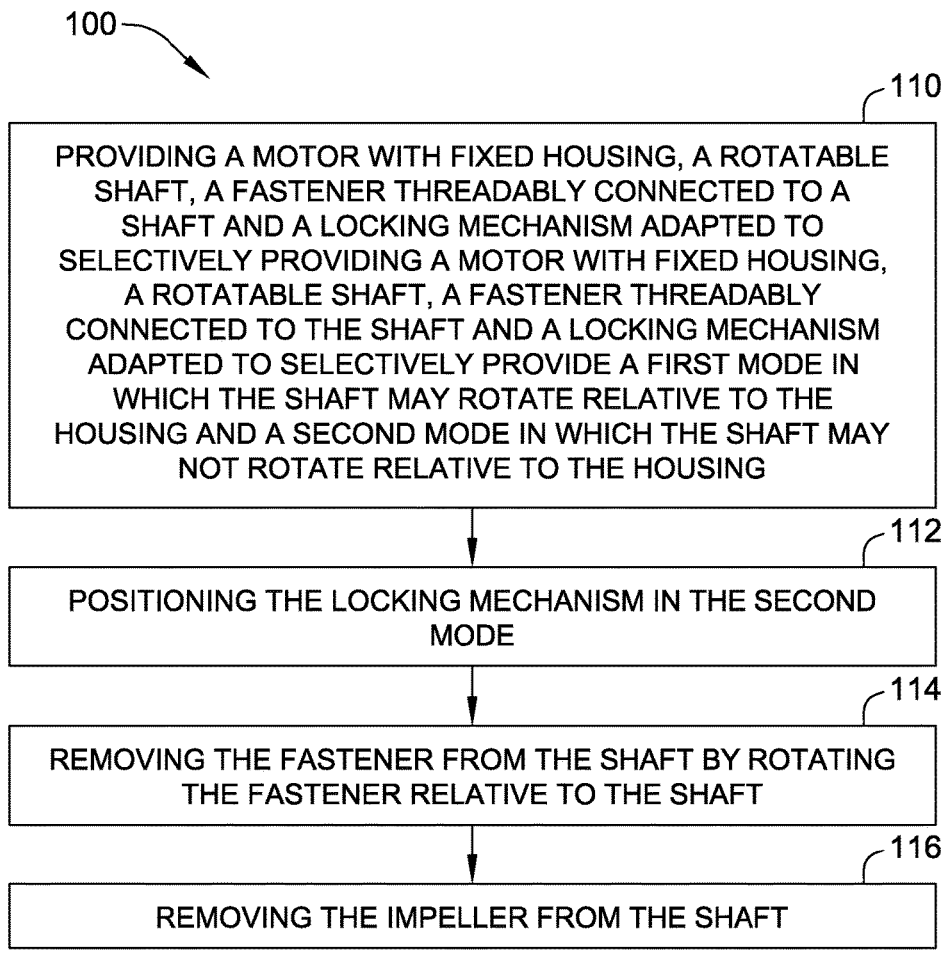
FIG. 6 is a flow chart of another embodiment of the present invention in the form of a method for providing an electric machine.

For example, and as shown in FIGS. 4 and 5, the end cap 20 is centrally positioned in the motor 10, also known as pin housing 52, In combination with mating pin housing cap 54, the pin housing 52 forms a pin passageway 56 for slidably receiving the pin 44. The pin housing 52 and pin housing cap 54 may, as shown, be removeably connected to each other by, for example, a plurality of threaded cap screws 58.

The pin housing 52 may, as shown in FIGS. 4 and 5, include alternate locations to place the pin housing cap 54 so that the pin 44 may engage the shaft 22 at first alternate position 59 or at second alternate position 61, depending on the position of the groove 48 and the available room in the motor 10 for the pin housing cap 54 and the pin 44.

Referring to FIG. 5, the pin 44 may have any shape and may, as shown, for simplicity, be cylindrical and may, as shown, include a central stop 60 to limit the motion of the pin 44 within the pin passageway 56. The pin 44 may, as shown, further include a head 62 to assist in actuating the pin 44. The pin passageway 56 may include a spring chamber 64 for slidably receiving a biasing member 66 which is a portion of the biasing mechanism 42 for biasing the pin 44 and the locking mechanism 34 in the first mode 36. A stop passageway 67 slideably receives the stop 60. As shown, the biasing member 66 is a spring. As shown, the spring 66 is a coil spring.

While, as shown, the pin 44 is biased in the first mode 36, it should be appreciated that the pin 44 may be biased in the second mode 38 or may be selectively biased in both directions by use of, for example, a cam, for example, a mechanism 43 like that of a ball point pen with a retractable tip.

Referring again to FIG. 2, the pin 44 may be accessed for movement from the first mode 36 to the second mode 38 in any suitable manner. For example the housing 12. For example, end cap 20 may define an opening 68 in the end cap 20 to provide access to the pin 44.

According to another aspect of the present invention and continuing to refer to FIG. 2, the motor 10 may further include a seal 70 to seal the opening 68 in the housing 12. The seal 70 may permit the pin 44 to pass through the seal 70 for actuating the pin 44. Alternatively, and as shown in FIG. 2, the seal 70 may have a resilient central portion 72 against which the operator may push to move the head 62 of the pin 44 below. The seal 70 with the resilient central portion 72 may be considered a cover, cap or plug. The seal 70 permits movement of the pin 44 to selectively slide the pin 44 to selectively provide the first mode 36 and the second mode 38. The seal 70 may include an outer portion 74 that cooperates with the housing 12 to seal the opening 68. The outer portion may have a circumferential internal groove 76 that mates with rim 78, forming the opening 68

While the motor 10 is well suited to lock a shaft in any application when one end of the shaft is inaccessible, the motor 10 is particularly well suited for use with a pump 80 to form a motor pump assembly 82. The pump 80 may, for example, be used in a pool or spa (not shown). The pump 80 may be fitted over end cap 20 of the motor 10. The pump 80 may include an impeller 84 that is mounted to pump end 86 of the shaft 22. The pump end 86 of shaft 22 may include external threads 88 which mate with the impeller 84. To assemble, and more importantly to disassemble the impeller 84 from the shaft 22, the shaft 22 must be held stationary while the impeller 84 or a fastener (not shown) is rotated. The shaft 22 may not be accessed on its opposite end 90, opposed to the pump end 86, since the controller 40 blocks access to the opposite end 90. The pin 44 is depressed at the seal 70 to move the pin 44 into the second mode. The pin 44 engages the groove 48, locking the shaft 22 so that the impeller 84 may be either assembled or disassembled.

According to another embodiment of the present invention, a method 100 for removing a pump impeller from the shaft of a motor is provided. The method includes the step 110 of providing a motor. The motor includes a fixed housing, a rotatable shaft, a fastener threadably connected to the shaft, and a locking mechanism. The locking mechanism is adapted to selectively provide a first mode in which the shaft may rotate relative to the housing and a second mode in which the shaft may not rotate relative to the housing. The method includes the step 112 of positioning the locking mechanism in the second mode, step 114 of removing the fastener from the shaft by rotating the fastener relative to the shaft, and step 116 of removing the impeller from the shaft.

The methods, systems, and apparatus described herein facilitate efficient and economical locking of a shaft of an electric machine. Exemplary embodiments of methods, systems, and apparatus are described and/or illustrated herein in detail. The methods, systems, and apparatus are not limited to the specific embodiments described herein, but rather, components of each apparatus and system, as well as steps of each method, may be utilized independently and separately from other components and steps described herein. Each component, and each method step, can also be used in combination with other components and/or method steps.

When introducing elements/components/etc. of the methods and apparatus described and/or illustrated herein, the articles "a", "an", "the", and "the" are intended to mean that there are one or more of the element(s)/component(s)/etc. The terms "comprising", "including", and "having" are intended to be inclusive and mean that there may be additional element(s)/component(s)/etc. other than the listed element(s)/component(s)/etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Described herein are exemplary methods, systems and apparatus utilizing a simple efficient device to lock a shaft for assembly and disassembly of an attachment to the shaft. The methods, system and apparatus described herein may be used in any suitable application. However, they are particularly suited for HVAC and pump applications.

Exemplary embodiments of the pump, motor and method are described above in detail. The electric machine and its components are not limited to the specific embodiments described herein, but rather, components of the systems may be utilized independently and separately from other components described herein. For example, the components may also be used in combination with other machine systems, methods, and apparatuses, and are not limited to practice with only the systems and apparatus as described herein. Rather, the exemplary embodiments can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electric machine comprising:
   a housing;
   a coil operably connected to said housing;
   a rotor, rotatably secured to said housing and defining a first end thereof extending outwardly from a first end of said housing, said rotor defining an axis of rotation thereof; and
   a locking mechanism connected to the housing and selectively connected to the rotor, said locking mechanism adapted to selectively provide a first mode in which the rotor may rotate relative to the housing and a second mode in which the rotor may not rotate relative to the housing, wherein the locking mechanism comprises a pin mounted in said housing and slidable in a direction transverse to the axis of rotation of said rotor, the pin being selectively biased in the first mode in which the pin is spaced from said rotor and to be selectively biased in the second mode in which the pin is engaged with said rotor and wherein said housing defines an opening therein to provide access to said pin.

2. The machine as in claim 1, wherein the electric machine further comprises a controller for selectively electrically energizing said coil, at least a portion of said controller positioned adjacent a second end of said housing, the second end of said housing opposed to the first end of said housing.

3. The machine as in claim 1, further comprising a seal to seal the opening in the housing, the seal adapted to permit movement of the pin to selectively slide the pin to selectively provide the first mode and the second mode and adapted to permit the movement of the pin by an operator without the removal of the seal from the housing.

4. The machine as in claim 3, wherein the pin is completely positioned internal to the seal.

5. The machine as in claim 1, further comprising a spring to selectively bias the locking mechanism in the first mode and to selectively bias the locking mechanism in the second mode with a mechanism like a ball point pen.

6. The machine as in claim 1:
Further comprising a shaft having an external periphery thereof and extending from an end of said rotor; and
wherein the shaft defines a longitudinal groove on the periphery of the shaft.

7. The machine as in claim 1, wherein at least one of said housing and said rotor are adapted to cooperate with a pump.

8. The machine as in claim 1, further comprising a cam to position the locking mechanism the selected one of the first mode and the second mode.

9. An electric motor for use with a pump for use in a one of a pool and a spa, said motor comprising:
a motor housing including an end cap having first and second spaced apart pin housing cap locations;
a pin housing cap, selectively mountable to said motor housing;
a stator fixedly secured to said motor housing, said stator including at least one coil;
a rotor, rotatably secured to said housing, said rotor including a shaft defining a centerline thereof, the shaft defining a first end thereof extending outwardly from a first end of said motor housing;
a controller for selectively electrically energizing said coil to produce a magnetic field, a least a portion of said controller positioned collinear with the centerline of the shaft; and
a locking mechanism connected to the motor housing and selectively connected to the rotor, said locking mechanism adapted to selectively provide a first mode in which the rotor may rotate relative to the motor housing and a second mode in which the rotor may not rotate relative to the motor housing, wherein the locking mechanism comprises a pin, the pin selectively engaging the shaft to selectively provide the first mode and the second mode, said pin housing cap selectably mountable in a selected one of the first pin housing cap location of said motor housing and the second pin housing cap location of said motor housing.

10. The electric motor as in claim 9, wherein said housing defines an opening therein to provide access to said pin.

11. The electric motor as in claim 10, further comprising a seal to seal the opening in the housing, the seal adapted to permit movement of the pin to selectively slide the pin to selectively provide the first mode and the second mode.

12. The electric motor as in claim 9, further comprising a spring to bias the locking mechanism in the first mode.

13. The electric motor as in claim 9, wherein the shaft defines a longitudinal groove on the periphery of the shaft.

14. The electric motor as in claim 9, further comprising a spring to bias the locking mechanism in the second mode.

15. The electric motor as in claim 9, further comprising a cam to position the locking mechanism the selected one of the first mode and the second mode.

16. A method for removing a pump impeller from the shaft of a motor, the method comprising the steps of: providing a motor with a housing defining spaced apart first and second pin passageways, a rotatable shaft, a fastener threadably connected to the shaft and a locking mechanism including a pin positioned transversely to said shaft and selectively engaging therewith, said pin extending through the housing, the locking mechanism adapted to selectively provide a first mode in which the shaft may rotate relative to the housing and a second mode in which the shaft may not rotate relative to the housing; positioning said pin with respect to said housing in one of first and second pin passageways, positioning the locking mechanism in the second mode; removing the fastener from the shaft by rotating the fastener relative to the shaft; and removing the impeller from the shaft.

\* \* \* \* \*